May 3, 1966    F. WARE    3,249,534
FIRE RETARDING COMPOSITION AND METHOD OF USING PHOSPHATE
ROCK AND SHALE
Filed Oct. 17, 1962

INVENTOR
FRANK WARE
BY
*Fay & Fay*
ATTORNEYS

United States Patent Office 3,249,534
Patented May 3, 1966

3,249,534
FIRE RETARDING COMPOSITION AND METHOD OF USING PHOSPHATE ROCK AND SHALE
Frank Ware, 12092 Chillicothe Road, Chesterland, Ohio
Filed Oct. 17, 1962, Ser. No. 231,177
4 Claims. (Cl. 252—8.1)

This invention relates to a fire-retarding composition and more specifically to the method of using naturally occurring phosphate rock and shale obtained from Phosphoria formations, deposits, or beds, as a fireproofing material for wooded areas containing shrubs, trees, and other forms of vegetation which are easily ignited. Still more specifically, this invention relates to a method of using a naturally occurring phosphate rock and shale on many household articles by combining the fireproofing rock with a carrier, and more particularly an adhesive carrier which facilitates its application in the form of fine particles or dust.

With the increasing losses of life and property, it has become necessary to improve on the methods and the types of chemicals available for fighting fires, and particularly forest fires from which losses range into the millions each year. Presently there are programs reported to evaluate the effectiveness of selected chemicals to retard or slow down the advance of fires and to determine their effectiveness on various fuels. The fuels referred to are those materials which carry the fires, such as grass, brush, leaves, dry branches, and the like. In addition to being primarily a fire retardant, the chemical must be considered from the standpoint of being applied easily over an area and cannot be corrosive, toxic, or very costly, and should not be difficult to mix or spread over large areas. Presently, aqueous solutions of phosphates, borates, sulfates, and particularly diammonium phosphate, are being tested and used to control fires. Most of these studies have shown a decided advantage in using a chemical in comparison to pure water in preventing the start and spread of fires. These aqueous chemical solutions are being applied by using tank trucks and even more recently by air tankers as a means of spreading the fire retardant over large areas. Aqueous solutions ranging from 2 to 15 percent of chemical have proved to be far superior in preventing or inhibiting the spread of fires in comparison to water alone and thus have encouraged the discovery of compositions which can be applied in the same manner but at a much lower cost and in a more permanent state.

Most of the water-soluble salts, such as the ammonium phosphates, sodium borates, and the like, have the disadvantage of being water soluble and are washed away easily by heavy rains which thus requires repeated treatment and is prohibitive at least from the standpoint of cost. Aside from the solubility problem, even the best of the known forest fire retardants have not been entirely effective under severe burning conditions, such as in the western part of the country where heavy fuel, e.g. dry grass, brush, etc., is found. The most likely reason for this ineffectiveness is that these heavier fuel surfaces do not retain a sufficient amount of the chemical and, therefore, under severe temperature will burn.

The corrosiveness of these retardant chemicals also must be considered since they will be stored and handled in metal containers and equipment. Thus, for example, salt solutions, such as calcium chloride and the ammonium phosphates, particularly the diammonium phosphates, being unstable have a tendency to promote corrosion. To avoid these problems and to provide a chemical, and particularly a naturally occurring chemical composition which would retard fires adequately and prevent their spread, it was necessary to find a material which is present in great abundance and effective for the purposes disclosed.

It was discovered that the phosphate rock and shale found in the Phosphoria formations, and other forms of phosphate beds, or the like, when properly reduced to the desired particle size and mixed with a suitable carrier, and particularly an adhesive material, could be applied easily over areas which are most prone to fire. The application of this naturally occurring phosphate material in the critical areas along roadways, camp-sites, and other similar areas would help to lower the annual loss of valuable stands of forest and acres of cropland, as well as other valuable property, by treating these areas particularly with the rock containing high percentages of phosphorus oxide and associated elements.

Accordingly, it is an object of this invention to provide a low cost naturally occurring phosphate rock and shale as a fire retardant for areas where the use of normal chemical treatment is limited due to the prohibitive cost. Moreover, it is an object of this invention to provide a naturally occurring phosphate rock and shale containing effective amounts of phosphorus oxide and associated elements as a means of preventing fires in wooded areas containing dry shrubs, leaves, and other combustible materials.

Still more specifically, it is an object of this invention to provide a naturally occurring rock which can be used as a fire retardant in the home and particularly in the yard on shrubs, leaves, and bushes, and to inhibit these materials against fire.

It is still another object of this invention to provide low cost, abundantly available phosphate rock which occurs naturally in Phosphoria formations or beds, or other phosphate deposits, which can be sized and mixed intimately with carriers, such as an adhesive, and applied to various articles to obtain a fire retardant surface.

More specifically, it is an object of this invention to treat vegetation with the phosphorus containing rock and shale to the extent that the phosphorus oxide is absorbed by the vegetation and becomes permanently fireproofed and is not readily dissolved or washed from the surface after exposure to rain, wind, and other weather conditions.

It is still another object of this invention to provide a low cost, naturally occurring phosphate rock as a fireproofing composition or retardant for treating large areas of trees, bushes, shrubs, crops, and similar growth to obtain a substantially fire-resistant protective coating sufficient to withstand high burning temperatures over long periods of time without requiring periodic retreatment.

It is a still further object of this invention to provide a method of treating vast areas of trees and similar materials found in our forest countryside with a naturally occurring phosphate rock and shale sufficient in phosphorus oxide content to inhibit or retard the spread of fire. The abundance and low cost of the naturally occurring rock provides a means of spreading a sufficient dosage of the retardant over large areas by spraying, air-bombing, or other similar methods, without regard to toxicity to animal or plant life.

These and other objects of the invention will become apparent from a further and more complete description to follow.

It has been discovered, quite unexpectedly, that a naturally occurring phosphate rock containing a phosphorus oxide content ranging from 0.25 to 40 percent by weight would have sufficient fireproofing properties and accordingly could be used in combination with a carrier, and more particularly an adhesive carrier, as a fire retardant.

It was discovered that up applying this naturally occurring phosphate rock to different types of vegetation, such as trees, bushes, etc., over a period of time, the phosphorus oxide and associated elements found in the rock were absorbed into the surface and in some instances to the extent of ⅛ inch or more. This absorption of the phosphorus oxide and other elements acted as a fire retardant and withstood temperatures to approaching 900° F. even after long periods of exposure to weather conditions of rain, snow, and wind.

The naturally occurring phosphorus oxide contained in the rocks referred to are found in many forms in the Phosphoria formations of the West, in phosphate beds or deposits in southern States, such as Florida, Tennessee, and more particularly in the western States, such as Montana and Idaho.

This phosphorus oxide-containing rock from any of these areas may be pulverized to a particle size ranging from 50 to 500, preferably 80 to 350 mesh, and combined with 5 to 85 percent, preferably 50 to 60 percent, by weight of a carrier; more specifically an adhesive carrier. The particle size and the relative proportions of the carrier and rock depend on the intended application, the area to be treated, and the relative cost and availability of the carrier. Thus, where a large area of trees is to be treated, by necessity the carrier would be of comparatively inexpensive material which could be applied by spraying, or from the air in large amounts, to prevent the start or spread of a fire.

In addition to the carrier it is advisable in some instances to use a small amount of a detergent, ranging from 0 to 2 percent by weight, so as to provide a mixture which will wet the surface on which it is applied, and will have a tendency to penetrate. The particular wetting agents or detergents used will depend upon the carrier and will vary in amount, depending upon where it is to be used. Thus, for example, aqueous systems, such as the emulsions, the alkyl aryl sulfonates, particularly the sodium salts, have proved to be satisfactory. Other wetting agents or detergents include the non-ionic dispersants, such as the polyalkaline glycol ether, the anionic sodium heptadecylsulfate, sodium hexadecylsulfate, sodium di-2-ethylhexyl phosphate, sodium tetradecylsulfate, and sodium-2-ethylhexylsulfate. The use of these surfactants or detergents is particularly helpful in applying aqueous dispersions or emulsions, since it will avoid the possibility of having the composition accumulate in the spraying equipment, particularly in the nozzle of the high-pressure gun. By using small amounts of these surface active agents, the wettability will be improved to the extent that larger areas can be covered or more mileage per unit weight of composition can be obtained due to the presence of the wetting agent.

While the addition of these surfactants may be helpful and in some cases essential, they are not, however, critical to the effectiveness of the fire retardant in that they are used only to facilitate the application, pariculary in an aqueous medium.

In referring to the drawings FIGURE 1 shows an index map which gives the location of a specific Phosphoria formation. FIGURE 2 illustrates a stratographic section showing the location of the entire Phosphoria formation from Big Sheep Canyon to Indian Creek, for a total of about 74 miles. FIGURE 3 is a legend showing the character of the various deposits illustrated in FIGURE 2. Referring more particularly to FIGURE 2 the Phosphoria is divided into units E, D, C, B, and A. These Phosphoria formations and deposits have rock and shale sections containing from about 0.25 to 40 percent by weight of $P_2O_5$. A particular cut "A" in Unit D at Sawtooth Mountain, point 12 on the index map, shows the exact location as it exists in the southern part of Monana. The vertical depth of Unit D is approximately 60 feet and consists essentially of phosphate rock, comprising about 5 to 31 percent by weight of phosphorus oxide, mudstone, and minor amounts of dolomite and chert.

The exact composition of cut "A" of Unit D has the following analytical description.

TABLE I.—CUT A

| Assay No. | Percent | | | Width | Description |
|---|---|---|---|---|---|
| | U | Th | $P_2O_5$ | | |
| 12 | 0.001 | 0.2 | 0.25 | Slump | Chert. |
| 11 | 0.001 | 0.1 | 0.50 | 3' | Argillaceous siltstone. |
| 14 | 0.001 | 0.2 | 30.91 | 3'' | Phosphate rock. |
| 10 | 0.001 | 0.2 | 18.79 | 12'6'' | Phosphate shale. |
| 13 | 0.003 | 0.2 | 27.05 | 2'5'' | Phosphate rock. |
| 9 | 0.002 | 0.2 | 11.16 | 18'4'' | Black shale seams with a 6'' seam of pure phosphate rock, the shale section being highly petroliferous. |
| 8 | 0.001 | 0.1 | 1.47 | 2'4'' | Siltstone. |
| 7 | 0.001 | 0.2 | 8.68 | 8'1'' | Petroliferous shale. |
| 6 | 0.003 | 0.1 | 2.06 | 2'2'' | Petroliferous siltstone. |
| 5 | 0.003 | 0.2 | 9.73 | 4'9'' | Phosphatic shale petroliferous with 3'' seam of phosphate rock. |
| 4 | 0.001 | 0.2 | 3.16 | 2'3'' | Siltstone. |
| 3 | 0.002 | 0.2 | 10.73 | 8'6'' | Black dolitic phosphate rock which is petroliferous. |
| 2 | 0.005 | 0.1 | 30.59 | 1'3'' | Phosphate rock, slightly petroliferous. |
| 1 | 0.002 | 0.2 | 28.14 | 1'5'' | Petroliferous phosphate rock. |

In addition to the U, Th, and $P_2O_5$ content of the above-described Cut A, as shown in the graph of the Phosphoria formation of Unit D at Sawtooth Mountain (12), the following chemical analyses also were obtained.

The Phosphoria in the southwestern part of Montana is shown to be divided into five groups in an ascending order of sandstone dolomite, a thin phosphatic shale, a sandstone dolomite chert, an upper phosphatic shale, and a chert quartz sandstone. The upper phosphatic shale member, or Unit D as indicated in the chart and more specifically in the table, is particularly rich in phosphate rock and shale which contain higher percentages of $P_2O_5$. Unit D contains phosphate rock comprising 10 to 20 percent of a carbonate fluoro-apatite. The mudstone of this unit may contain as much as 20 to 25 percent organic matter, about 10 percent of which is a distillable oil. Commercially this phosphate rock is available as one or more phosphate minerals, primarily calcium phosphate, but may include phosphitized limestone, sandstone, shale, and other forms of phosphate rock. While these phosphate materials do not have a definite chemical structure, the major minerals are of the apatite group and are represented by the formula $Ca_{10}(PO_4CO_3)_6(FClOH)_2$ where in some instances the phosphate radical is replaced with small quantities of metal oxides and the anions, i.e. fluorine, may be a combination of fluorine, chlorine, and hydroxyl ions, or any one alone. In addition, small quantities of calcium may be replaced by elements, such as magnesium, manganese, strontium, lead, sodium, uranium, cerium, and yttrium. Other impurities include iron as limonite, clay, aluminum phosphate, fluorine, and silica as quartz.

Particularly in the western States, the Phosphoria formations range from 60 to 180 feet in thickness and contain yellowish or brown phosphatic shale, limestone, and oolitic phosphate rock.

This phosphate rock, as described, refers to naturally occurring forms of the rock and shale containing approximately 0.25 to 40 percent by weight of the $P_2O_5$ as the essential constituent. To be able to use this form of rock for purposes of fireproofing, or as a fire retardant, is commercially important because it has a definite advantage over the use of pure chemicals in that it is cheaper and is available in large quantities. The availability and effectiveness of this naturally occurring phosphate rock as a fire retarder makes it particularly valuable for treating large wooded areas which for all practical purposes are difficult, if not impossible, to fireproof by methods or chemicals heretofore known. The fact that vegetation, grass, brush, trees, and other forms of plant life normal-

TABLE II.—ANALYSES OF ORE

| Sample Assay No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Major, greater than 10%. | $P_2O_5$ | CaO $P_2O_5$ | $SiO_2$ | | $SiO_2$ | $SiO_2$ | | CaO | | | CaO | $SiO_2$ | CaO $P_2O_5$ | CaO $P_2O_5$ |
| Major/Minor, 5-25% | $SiO_2$ CaO | | $Al_2O_3$ CaO $P_2O_5$ | $SiO_2$ CaO | $Al_2O_3$ CaO $P_2O_5$ | $Al_2O_3$ CaO | $SiO_2$ CaO | | $SiO_2$ CaO $P_2O_5$ | $SiO_2$ CaO | | | $SiO_2$ | $SiO_2$ |
| Minor, 1-10% | | $SiO_2$ | | MgO $P_2O_5$ | | MgO | $Al_2O_3$ $P_2O_5$ | $SiO_2$ MgO | | $Al_2O_3$ $K_2O$ $P_2O_5$ | $SiO_2$ | | | |
| Minor/Low, .5-5% | $Al_2O_3$ $Fe_2O_3$ | $Al_2O_3$ $Fe_2O_3$ | $Fe_2O_3$ | $Al_2O_3$ $Fe_2O_3$ $K_2O$ | $Fe_2O_3$ $K_2O$ | $Fe_2O_3$ $P_2O_5$ | $Fe_2O_3$ $K_2O$ | $P_2O_5$ | $Al_2O_3$ $Fe_2O_3$ $K_2O$ | $Fe_2O_3$ | MgO | CaO | $Al_2O_3$ $Fe_2O_3$ | $Al_2O_3$ $Fe_2O_3$ |
| Low, .1-1% | MgO $Na_2O$ $K_2O$ | MgO $Na_2O$ | $TiO_2$ MgO ZnO $Na_2O$ $K_2O$ | $Na_2O$ | $TiO_2$ MgO $Na_2O$ | $Na_2O$ $K_2O$ | MgO ZnO $Na_2O$ | $Al_2O_3$ $Fe_2O_3$ | MgO ZnO $Na_2O$ | $TiO_2$ MgO ZnO $Na_2O$ | $Al_2O_3$ $Fe_2O_3$ $P_2O_5$ | $P_2O_5$ | MgO ZnO $B_2O_3$ | MgO ZnO $B_2O_3$ |
| Low/Very low, .05-.5%. | $TiO_2$ $Cr_2O_3$ $V_2O_5$ ZnO | $V_2O_3$ $Cr_2O_3$ ZnO $K_2O$ | $Cr_2O_3$ | $TiO_2$ MnO | $Cr_2O_3$ ZnO | $TiO_2$ $Cr_2O_3$ MnO | $TiO_2$ $Cr_2O_3$ $V_2O_5$ | | $TiO_2$ $Cr_2O_3$ $V_2O_5$ | $Cr_2O_3$ $V_2O_5$ | | $Fe_2O_3$ | $Cr_2O_3$ $V_2O_5$ $K_2O$ | $Cr_2O_3$ $K_2O$ |
| Very low, .01-.1% | MnO $Li_2O$ | $TiO_2$ MnO | $V_2O_5$ MnO | $Cr_2O_3$ $V_2O_5$ ZnO $Li_2O$ | $V_2O_5$ MnO $Li_2O$ | $V_2O_5$ $Li_2O$ | $Li_2O$ | $TiO_2$ $Cr_2O_3$ $V_2O_5$ $Na_2O$ $K_2O$ | $Li_2O$ | $ZrO_2$ $Li_2O$ | $Cr_2O_3$ $V_2O_5$ $B_2O_3$ | $Al_2O_3$ $B_2O_3$ | $TiO_2$ MnO | $TiO_2$ $V_2O_5$ MnO |
| Very low/Trace, .005-0.5%. | $ZrO_2$ SrO | $ZrO_2$ SrO $Li_2O$ | NiO $ZrO_2$ SrO $Li_2O$ | SrO | NiO $ZrO_2$ $B_2O_3$ SrO | $ZrO_2$ $B_2O_3$ SrO | NiO MnO $ZrO_2$ $B_2O_3$ SrO | SrO | NiO $ZrO_2$ MoO_3 $B_2O_3$ SrO | CuO NiO MnO $MoO_3$ $B_2O_3$ SrO | $TiO_2$ MnO SrO | MgO $B_2O_3$ | NiO $ZrO_2$ SrO $Li_2O$ | NiO $ZrO_2$ SrO $Li_2O$ |
| Trace, less than .01% | CuO NiO $Bi_2O_3$ $MoO_3$ $SnO_2$ $Ag_2O$ $B_2O_3$ BaO $Cb_2O_3$ | CuO NiO $Bi_2O_3$ $MoO_3$ $SnO_2$ $Ag_2O$ $B_2O_3$ BaO $Cb_2O_3$ | CuO $Bi_2O_3$ $MoO_3$ $SnO_2$ $Ag_2O$ $B_2O_3$ BaO $Cb_2O_3$ | CuO NiO $Bi_2O_3$ $ZrO_2$ $MoO_3$ $SnO_2$ $Ag_2O$ $B_2O_3$ BaO | CuO $Bi_2O_3$ $MoO_3$ $SnO_2$ $Ag_2O$ BaO $Cb_2O_3$ | CuO $MoO_3$ $SnO_2$ $Ag_2O$ ZnO BaO | CuO $Bi_2O_3$ $MoO_3$ $SnO_2$ $Ag_2O$ BaO $Cb_2O_3$ | CuO $Bi_2O_3$ $MoO_3$ $SnO_2$ $Ag_2O$ BaO $Cb_2O_3$ | CuO NiO MnO $Bi_2O_3$ $ZrO_2$ $MoO_3$ $SnO_2$ $Ag_2O$ $B_2O_3$ ZnO BaO $Li_2O$ | $Bi_2O_3$ $SnO_2$ $Ag_2O$ BaO $Cb_2O_3$ CdO | CuO $Bi_2O_3$ $ZrO_2$ $MoO_3$ $SnO_2$ $Ag_2O$ $B_2O_3$ ZnO BaO $K_2O$ $Li_2O$ | $TiO_2$ CuO NiO $Cr_2O_3$ $V_2O_5$ MnO $Bi_2O_3$ $ZrO_2$ $MoO_3$ $SnO_2$ $Ag_2O$ ZnO BaO SrO $K_2O$ $Li_2O$ | CuO $Bi_2O_3$ $MoO_3$ $SnO_2$ $Ag_2O$ $B_2O_3$ BaO $Cb_2O_3$ CdO | CuO $Bi_2O_3$ $MoO_3$ $SnO_2$ $Ag_2O$ $B_2O_3$ BaO CdO | ly found in a wooded area, which are susceptible to burning, absorb small amounts, i.e. 0.01 to 0.15 percent of $P_2O_5$ from the rock and become substantially fireproofed, opens the way to the possibility of treating these areas not only to prevent fires from starting but also from spreading.

The manner in which the phosphate rock is applied to the brush, trees, and the like, may be by one of several methods, such as spraying or air-bombing, either as a dust containing an adhesive which would permit the powder to adhere to the trees or by the use of emulsions, or aqueous dispersions which contain sufficient amounts of the phosphate rock to coat the area and thus substantially retard burning.

The fact that a wooded area may be fireproofed is illustrated by examining segments taken from the branches of trees which have been treated with the phosphate rock and shale as described herein as cut "A" located in Section 15, Township 12, South Range 5, West Principal Meridian, Montana. The branches, of approximately two inches in diameter, taken from pine trees, were treated with the phosphate rock and analyzed chemically to determine the amount of metal and $P_2O_5$ absorbed through the outer surface. Samples were taken from the bark of both a dry and a green branch to a depth of about 1/16 inch and labeled as samples 2 and 4. Plugs of approximately one inch were taken from the same dry and green branches at the center, and labeled as samples 1 and 3. Each of the samples (1 to 4) were analyzed to determine the amount of the elements and the $P_2O_5$ on the outer surfaces, or more specifically within approximately 1/16 inch from the outer surface, and compared with the amount of elements and $P_2O_5$ found in the plugs, which were taken from the center of the branches.

TABLE III

| Element | Percent | | | |
|---|---|---|---|---|
| | Dry branch, 2" diam. | | Green branch, 2" diam. | |
| | 1 | 2 | 3 | 4 |
| $PO_4$ | 0.011 | 0.153 | 0.01 | 0.13 |
| Si | 0.016 | 0.34 | −0.033 | .22 |
| Al | 0.008 | 0.34 | (¹) | .045 |
| Fe | 0.008 | 0.85 | (¹) | .045 |
| Ti | (¹) | 0.034 | (¹) | .022 |
| Cu | −0.0016 | 0.017 | −0.0033 | −0.0045 |
| Ni | (¹) | 0.0034 | (¹) | (¹) |
| Cr | (¹) | 0.0017 | (¹) | (¹) |
| V | (¹) | 0.0017 | (¹) | (¹) |
| Mn | 0.008 | 0.034 | −0.0033 | −0.0045 |
| Ca | 0.80 | +0.34 | 0.33 | 2.2 |
| Mg | 0.08 | 0.17 | 0.033 | 0.045 |
| Zr | (¹) | 0.0034 | (¹) | (¹) |
| Pb | (¹) | 0.034 | (¹) | (¹) |
| Sn | (¹) | 0.0034 | (¹) | (¹) |
| Ag | (¹) | −0.00034 | (¹) | (¹) |
| B | (¹) | 0.0017 | (¹) | (¹) |
| Zn | (¹) | 0.017 | (¹) | (¹) |
| Ba | (¹) | 0.0034 | −0.0033 | −0.0045 |
| Sr | 0.008 | 0.0034 | (¹) | −0.0045 |
| Na | −0.0016 | 0.17 | −0.0033 | 0.022 |
| K | −0.0016 | 0.85 | −0.0033 | −0.0045 |
| Li | (¹) | 0.0034 | −0.0033 | (¹) |

¹ Not detected.

The following elements were looked for and not detected in each sample: Bi, Mo, Co, Sb, As, Cb, W, Cd.

It should be noted from the above analytical data that the amount of $PO_4$ found at the center or core of the two inch diameter branch in Sample 1 was 0.011, whereas on the same branch, the outer surface which was analyzed by taking about 1/16 inch scraping (Sample 2) gave a $PO_4$ value of 0.15, which is greater than ten times the amount of $PO_4$ found on the inner core. Likewise, similar ratios were found in the case of the scraping and the plug taken from the green branch (Samples 3 and 4). This indicates that the branches treated with the phosphate rock and shale had absorbed $P_2O_5$ to the extent indicated in the table, making a normally combustible material fire retardant. Moreover, the other metals, such as silicon, aluminum, titanium, copper, potassium, magnesium, etc., were found to appear in higher percentages in the outer surfaces in comparison to the interior, which further indicates that the combination of these elements absorbed by the branches were responsible for the fire-retarding properties. While the primary retardant is phosphorus oxide, the presence of the other metals found together with the phosphorus oxide, causes a coaction therewith to effectively retard or fire-proof the branches.

Accordingly, then, as indicated by the analysis of both the dead or dry branches and the green or living branches, it is possible for trees, shrubs, grass, bushes, cornstalks, or other types of vegetation or flammable materials to be treated with a naturally occurring phosphate rock and shale to fireproof or substantially retard burning.

To accomplish this result, it was discovered that large areas of open fields, shrubs, and trees, could be treated by spraying, dusting, or other known methods, by using in combination with the rock and shale from about 5 to 85 percent by weight a carrier which preferably is an adhesive material. These materials may be either inorganic or organic, so that they adhere to the area being treated and will not be washed off readily or blown away by rain or windstorm, which would require repeated treatments. The amount of the carrier to be used will depend upon the relative amount of $P_2O_5$ found in the phosphate rock or shale. Thus, for example, where the percentage of $P_2O_5$ is 20 to 31 percent by weight of the rock, the adhesive or carrier may range up to 85 percent with only 15 percent of the rock. On the other hand, where the $P_2O_5$ content is less than 15 percent, the amount of phosphate rock used with the carrier may range from 50 to 85 percent by weight. Thus, as the amount of phosphorus oxide and associated elements in the shale increases, the amount used with the carrier can be decreased. The proportions ultimately, however, will depend upon the use and how the retardant is to be applied.

Typical carriers, and particularly the adhesive carriers may be organic, inorganic, or mixtures thereof, and include the water-base compositions comprising vinyl acetate, starch, asphalt emulsions, reclaimed rubber-latex cement, sodium silicate, or the solvent base carriers, such as the synthetic or natural resins and asphalt residues obtained from petroleum. Other types of carriers with adhesive properties are the hot-melt asphalts or wax mixtures which in themselves have a certain degree of thermal insulating properties. The water insoluble polyvinyl acetate emulsions in small amounts may be used with the phosphate containing rock to fireproof smaller areas where the cost of the adhesive is not a major consideration, such as small items around the home which are likely to start fires.

The asphalt emulsions or water dispersions can be brushed or sprayed over large areas or in small closed areas since they are non-toxic and non-inflammable and can be applied in a conventional manner. Most of these emulsions consist of suspended asphalt particles in the range of about 50 to 60 percent in water. Other aqueous or water soluble gums or resins which may be used as the carrier include gum karaya, dextrin, gum tragacanth, alginates, gum arabic, sodium carboxymethyl cellulose, hydroxyethyl cellulose, and other water soluble resins, such as the polymers of ethylene oxide, which have molecular weights ranging up to about 5,000,000. The particular adhesive carrier and the amount to be used with the phosphate rock will depend upon how and where it is to be applied. Thus, for example, where vast areas or acreages of trees are to be coated, it would be advisable, because of commercial necessity, to use the lower cost adhesives, particularly the water soluble gums or emulsions to distribute large amounts of the phosphorus oxide-containing rock. On the other hand, where a smaller area, such as a roof top or the inside surface of a garage or roof, is to be fireproofed, it may be advisable to use the emulsions, such as asphalt or the vinyl acetate dispersions. Likewise, the particle size of the phosphate rock will vary depending upon the use and the method by which it is to be applied. Preferably, particles ranging from 50 to 350 mesh would be satisfactory for most purposes, with the smaller mesh giving more coverage or mileage per unit weight and accordingly would be used where larger areas are to be coated.

As an illustration of fireproofing or making fire retardant objects or articles other than wooded areas, such as trees, a particular petroliferous shale containing approximately 10.73 percent by weight of $P_2O_5$ and rock containing approximately 29.36 percent by weight of $P_2O_5$ was obtained from the Phosphoria formation indicated as cut "A" and thoroughly mixed with the carrier. This mixture was applied as a fireproofing coating over a number of representative articles, such as lumber, tree-bark, leaves, paper, cardboard, wood, cotton, roof shingles, rubber, and other such related surfaces. After the items were treated with the fire retarding composition disclosed in the following examples, each was subjected to high temperatures by being exposed to a propane torch at a temperature in excess of 900° F.

The particular phosphate composition used is indicated by Shale "A" and Rock "B." The shale is Assay No. 3, containing 10.73 percent $P_2O_5$, at width of 8'6" from cut "A" of the Phosphoria formation in Unit D at Sawtooth Mountain, and is a black oolitic petroliferous shale. The Rock "B" is shown in Assays No. 1 and No. 2 and contains in addition a small amount of fluorine which indicates an apatite structure.

|  | Composition, percent chemical | |
| --- | --- | --- |
|  | Shale "A" | Rock "B" |
| $P_2O_5$ | 10.73 | 29.36 |
| U | 0.002 | 0.002 |
| Th | 0.2 | 0.2 |
| CaO | 10.00 | 10.00 |
| $SiO_2$ | 10.00 | 10.00 |
| $Al_2O_3$ | 10.00 | 5.00 |
| $Fe_2O_3$ | 5.00 | 5.00 |
| $TiO_2$ | 1.00 | 0.5 |
| MgO | 1.00 | 1.00 |
| ZnO | 1.00 | .05 |
| $Na_2O$ | 1.00 | 1.00 |
| $K_2O$ | 1.00 | 1.00 |
| $Cr_2O_3$ | 0.50 | 0.50 |
| MnO | 0.10 | 0.10 |
| $V_2O_5$ | 0.10 | 0.50 |
| NiO | 0.50 | 0.10 |
| $ZrO_2$ | 0.05 | 0.05 |
| SrO | 0.05 | 0.05 |
| $Li_2O$ | 0.05 | 0.01 |

The following elements are presented in 0.01 percent in Composition A and in 0.01 percent in Composition B: CuO, $Bi_2O_3$, $MoO_3$, $SnO_2$, $Ag_2O$, $B_2O_3$, BaO, $Cb_2O_3$

EXAMPLE I

Percent by volume

Phosphate shale of composition A (80 mesh) ____ 25
Polyvinylchloride aqueous emulsion carrier _____ 1
Alkyl aryl sodium sulfonate _____ 1

EXAMPLE II

Phosphate rock of composition B (80 mesh) ____ 20
Polyvinylchloride aqueous emulsion carrier ____ 79
Alkyl aryl sodium sulfonate _____ 1

EXAMPLE III

Phosphate rock of composition B (29.36% $P_2O_5$) _ 15
Aqueous asphalt emulsion (50% asphalt) _____ 85

EXAMPLE IV

Phosphate shale of composition A (10.73% $P_2O_5$) ---------------------------------- 60
Polyvinylacetate aqueous emulsion carrier ------ 40

EXAMPLE V

Phosphate shale of composition A (10.73% $P_2O_5$) ---------------------------------- 40–80
Aqueous solution of hydroxyethyl cellulose (2%)_ 20–60

Aside from treating objects and smaller areas with the compositions as indicated above, it was discovered that large areas of trees, grass, bushes, and other forms of shrubs could be treated by spraying or aerial bombing, particularly to prevent the spreading of fire. This may be accomplished by using a power blower with atomizing nozzles. These sprays can be driven to horizontal distances reaching as far as 150 feet, whereas the coarser sprays may be driven only 20 to 40 feet, depending on the particle size of the phosphate rock. Aerial applications may be accomplished by spraying the required amount of the rock per acre of trees, e.g. 10 pounds per gallon of aqueous emulsion, depending on the amount of thicket and shrubbery. Normally, this could be released about 20 feet above the tops of the trees. However, in aerial applications, as distinguished from power blowers, the amount being spread per unit area must be increased due to the loss caused by draft, wind, and up-currents. Typical aerial spray compositions comprise a sodium algenate aqueous carrier containing 10 to 60 percent by weight of the phosphate rock, depending upon the $P_2O_5$ content and the area being treated. Other inorganic carriers include the gellants, such as the silicas, attapulgite clays, bentonites or other types of silica gels which are capable of thickening an aqueous mixture of the phosphate rock. The thickness should be sufficient to impart adhesive characteristics which make it more susceptible to adhering on the surface to which it is applied.

In addition to utilizing the ore as a naturally occurring phosphate rock, as found in the bed or Phosphoria formation, it is possible to remove some of the material, such as the clay, siltstone, dolomite, silica, or any of the ingredients which add to the bulk of the rock but contribute little to the composition as a fire retardant Thus, a modified form of the rock could be prepared by removing the clay and siltstone without appreciably removing those metals which are responsible for the fire retardant properties, thus making commercially possible the spreading of large amounts of the rich $P_2O_5$ rock over vast areas with a smaller amount of material which adds little to the fire preventing properties of the phosphorus oxide and other metals found in the rock.

In addition to using naturally occurring phosphate rock and shale from the Phosphoria formations and other phrosphorous containing beds as a fireproofing material, it is possible also to use the rock as a constituent of building materials. Thus, for example, large volumes of the rock, containng high percentages of phosphorus oxide, may be used in the preparation of masonry products, such as brick, stone, or in building materials, such as asphalt shingles, plasters, asphalt floor compositions, drywall, paints, or other coating materials generally used in the construction field. The tendency of the rock to inhibit or retard fire from starting or spreading would be extremely valuable. Large amounts of this low cost phosphorus rock could be obtained and used as a filler in the building trade.

While the invention has been described with reference to specific examples, it is understood that it is not intended to be limited thereto, and that many variations and changes may be made within the true spirit of the invention. The only limitations intended are those recited hereinafter in the appended claims.

The invention claimed is:

1. A method of fire-proofing flammable materials which comprises treating said materials with an effective amount of a fire-proofing composition consisting essentially of a natural-occurring phosphate rock having about 0.25 to 40% by weight of phosphorous oxide and a particle size ranging from about 50–500 mesh and 5–85% by weight of the composition of a carrier; said carrier consisting of a water-base composition selected from the group consisting of polyvinylchloride, polyvinylacetate, alginates, asphalts, sodium silicate, dextrin, water-soluble ethylene oxide resin, sodium carboxymethyl cellulose, hydroxy ethyl cellulose, gum arabic, gum karaya, and gum tragacanth.

2. The method of claim 1 further characterized in that the fire-proofing composition contains from about 0 to 2.0% by weight of the composition of a wetting agent.

3. The method of claim 1 further characterized in that the natural-occurring phosphate rock has a particle size ranging from about 80–350 mesh, a phosphorous oxide content of about 20–31% by weight and is present in the fire-proofing composition in an amount of at least 15% by weight.

4. The method of claim 3 further characterized in that the carrier is a water-base composition of polyvinylacetate.

References Cited by the Examiner

UNITED STATES PATENTS

| | | | |
|---|---|---|---|
| 1,827,263 | 10/1931 | Roman | 252—8.1 XR |
| 2,163,085 | 6/1939 | Cupery | 252—8.1 XR |
| 3,080,316 | 3/1963 | Petertyl et al. | 252—8.1 XR |

OTHER REFERENCES

"Nonmetallic Minerals," Ladoo et al., 2nd ed. (1951), McGraw-Hill Book Co., pages 379, 380, 383, 388, 389.

"The Condensed Chemical Dictionary," "Rose," Reinhold Pub. Co., New York, N.Y. (1961), page 887.

JULIUS GREENWALD, *Primary Examiner.*

M. WEINBLATT, *Assistant Examiner*